(No Model.)

A. T. PEIRCE.
CAR AXLE.

No. 285,509.    Patented Sept. 25, 1883.

WITNESSES:

INVENTOR:

UNITED STATES PATENT OFFICE.

AMOS T. PEIRCE, OF FAIRHAVEN, MASSACHUSETTS.

CAR-AXLE.

SPECIFICATION forming part of Letters Patent No. 285,509, dated September 25, 1883.

Application filed July 2, 1883. (No model.)

*To all whom it may concern:*

Be it known that I, AMOS T. PEIRCE, a citizen of the United States, residing at Fairhaven, in the county of Bristol and State of Massachusetts, have invented a new and useful Improvement in Car-Axles, to obviate friction when running on curved rails, of which the following is a specification.

My invention consists in a device for safely securing a divided axle, so one end may revolve to prevent friction when running on curves.

Figure 1:
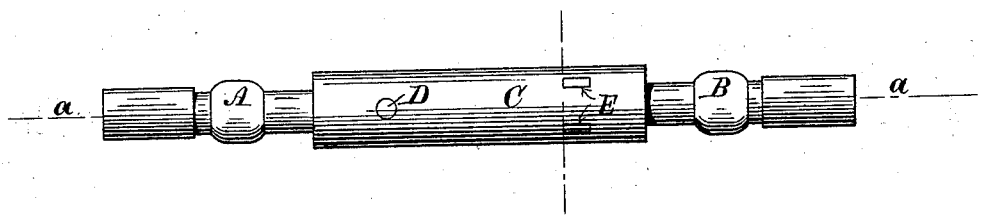
Figure 2:
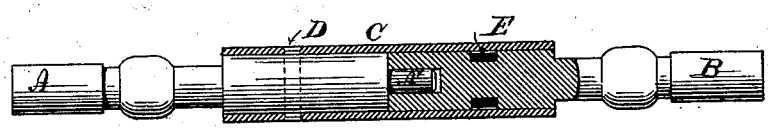
Figure 3:
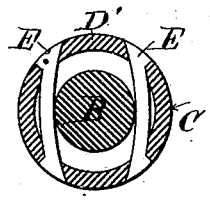

Figure 1 is a perspective view of my invention applied to a divided axle. Fig. 2 is a vertical section of Fig. 1, showing the device. Fig. 3 is a transverse section, showing the rivets.

Fig. 1: A B, the axle; C, the sleeve; D, a rivet for securing the sleeve and axle rigidly together. Other rivets may be thus affixed to secure greater strength. E is a device for securing the parts of the axle together. It consists in fixing one or more rivets transversely through the sleeve and projecting into an annular groove, D', in the axle. These rivets may be of any desired width for strength, with grooves in the axle in keeping to receive them. There may be more than represented, for safety and strength. A' is a center shaft, which secures the two parts of the axle in line $a\ a$ and prevents the sleeve from wearing.

I am aware that attempts have been made to produce a divided axle for the purpose set forth in this specification, which have proved impracticable.

The devices herein shown for connecting car-axles are susceptible of great strength, and the center shaft renders it impossible to deviate from a direct axial line.

What I claim as my invention, and desire to secure by Letters Patent, is—

In combination, solid axle A B, divided in the center, steady-pin A', revolving in countersink sleeve C, rivet E, and annular groove D', all constructed and operating substantially as and for the purposes set forth and described.

AMOS T. PEIRCE.

Witnesses:
SOUTHWARD POTTER, 2d,
JNO. DAVIS.